United States Patent
Legré et al.

(10) Patent No.: US 11,057,200 B2
(45) Date of Patent: Jul. 6, 2021

(54) APPARATUS AND METHOD FOR ENHANCING SECRET KEY RATE EXCHANGE OVER QUANTUM CHANNEL IN QUANTUM KEY DISTRIBUTION SYSTEMS

(71) Applicant: id Quantique SA, Carouge (CH)

(72) Inventors: Matthieu Legré, Veigy-Foncenex (FR); Grégoire Ribordy, Troinex (CH); Damien Stucki, Carouge (CH)

(73) Assignee: id Quantique SA, Carouge (CH)

( * ) Notice: Subject to any disclaimer, the term of this patent is extended or adjusted under 35 U.S.C. 154(b) by 46 days.

(21) Appl. No.: 16/471,387

(22) PCT Filed: Nov. 24, 2017

(86) PCT No.: PCT/EP2017/080349
§ 371 (c)(1),
(2) Date: Jun. 19, 2019

(87) PCT Pub. No.: WO2018/114219
PCT Pub. Date: Jun. 28, 2018

(65) Prior Publication Data
US 2020/0099520 A1    Mar. 26, 2020

(30) Foreign Application Priority Data
Dec. 20, 2016    (EP) .................................. 16205501

(51) Int. Cl.
*H04L 9/08*     (2006.01)
*H04B 10/70*    (2013.01)
*H04L 29/06*    (2006.01)

(52) U.S. Cl.
CPC ........... *H04L 9/0852* (2013.01); *H04B 10/70* (2013.01); *H04L 9/0827* (2013.01); *H04L 63/061* (2013.01); *H04Q 2213/1301* (2013.01)

(58) Field of Classification Search
CPC ... H04L 9/0852; H04L 9/0855; H04L 9/0827; H04L 63/061; H04B 10/70; H04Q 2213/1301
(Continued)

(56) References Cited

U.S. PATENT DOCUMENTS 5,307,410 A   4/1994 Bennett
5,953,421 A   9/1999 Townsend
(Continued)

FOREIGN PATENT DOCUMENTS

EP    3094038 A1    11/2016

OTHER PUBLICATIONS

Bennett, "Quantum Cryptography Using Any Two Nonorthogonal States", Physical Review Letters, 1992, pp. 3121-3124, vol. 68: 21.
(Continued)

*Primary Examiner* — Kambiz Zand
*Assistant Examiner* — Benjamin A Kaplan
(74) *Attorney, Agent, or Firm* — The Webb Law Firm (57) ABSTRACT

An apparatus for enhancing secret key rate exchange over quantum channel in QKD systems includes an emitter system with a quantum emitter and a receiver system with a quantum receiver, wherein both systems are connected by a quantum channel and a service communication channel. User interfaces within the systems allow to define a first quantum channel loss budget based on the distance to be covered between the quantum emitter and the quantum receiver and the infrastructure properties of the quantum channel as well as a second quantum channel loss budget associated to the loss within the realm of the emitter system. The emitter system is adapted to define the optimal mean number of photons of coherent states to be emitted based on the first and the second quantum channel loss budgets.

11 Claims, 6 Drawing Sheets

(58) Field of Classification Search
USPC .......................................................... 380/256
See application file for complete search history.

(56) References Cited

U.S. PATENT DOCUMENTS

| 2007/0014415 | A1* | 1/2007 | Harrison | ............... | H04L 9/0858 |
| | | | | | 380/278 |
| 2016/0134420 | A1* | 5/2016 | Guinnard | ............... | H04B 10/70 |
| | | | | | 380/256 |
| 2016/0337032 | A1 | 11/2016 | Johnson et al. | | |
| 2020/0153619 | A1* | 5/2020 | Ribordy | ............... | H04L 9/0852 |

OTHER PUBLICATIONS

Daneshgaran, "Improved Key Rates for Quantum Key Distribution Employing Soft Metrics Using Bayesian Inference with Photon Counting Detectors", Quantum Communications and Quantum Imaging IX, 2011, pp. 1-11, vol. 8163: 81630D.

Eraerds, "Quantum key distribution and 1 Gbps data encryption over a single fibre", New Journal of Physics, 2010, pp. 3-15, vol. 12: 063027.

Gisin et al., "Quantum cryptography", Reviews of Modern Physics, 2002, pp. 145-191, vol. 74.

Gyongyosi et al., "Adaptive Gaussian Quadrature Detection for Continuous-Variable Quantum Key Distribution", Advances in Photonics of Quantum Computing, Memory, and Communication IX, 2016, pp. 1-16, vol. 9762: 97620E-1.

Kim et al., "Cramer-Rao Lower Bound of Channel Estimator in Continuous Variable Quantum Key Distribution", ICTC, 2016, pp. 678-680.

Korzh et al., "Provably Secure and Practical Quantum Key Distribution over 307 km of Optical Fibre", 2014, pp. 1-7.

Lasota et al., "Robustness of quantum key distribution with discrete and continuous variables to channel noise", 2016, pp. 1-11.

Ruppert et al., "Long-distance continuous-variable quantum key distribution with efficient channel estimation", 2014, pp. 1-11.

Shibata et al., "Quantum key distribution over a 72 dB channel loss using ultralow dark count superconducting single-photon detectors", Optics Letters, Sep. 2014, pp. 5078-5081, vol. 39: 17.

Townsend, "Quantum cryptography on optical fiber networks", Proceedings of SPIE, Conference on Photonic Quantum Computing II, Jul. 1998, pp. 1-13, SPIE vol. 3385.

Townsend, "Simultaneous quantum cryptographic key distribution and conventional data transmission over installed fibre using wavelength-division multiplexing", Electronic Letters, Jan. 1997, pp. 188-190, vol. 33;3, IEE.

Yin et al., "Measurement device independent quantum key distribution over 404 km optical fibre", Jun. 2016, pp. 1-15.

* cited by examiner

APPARATUS AND METHOD FOR ENHANCING SECRET KEY RATE EXCHANGE OVER QUANTUM CHANNEL IN QUANTUM KEY DISTRIBUTION SYSTEMS

CROSS-REFERENCE TO RELATED APPLICATIONS

This application is the United States national phase of International Application No. PCT/EP2017/080349 filed Nov. 24, 2017, and claims priority to European Patent Application No. 16 205 501.6 filed Dec. 20, 2016, the disclosures of which are hereby incorporated by reference in their entirety.

BACKGROUND OF THE INVENTION

Field of the Invention

The present invention relates to an apparatus and method for enhancing secret key rate exchange over quantum channel in Quantum Key Distribution (QKD) systems, i.e. the present invention relates to quantum cryptography based on QKD and quantum channel loss impact on QKD systems operation.

Description of Related Art

Quantum cryptography or Quantum Key Distribution (QKD) is a method allowing the distribution of a secret key between two distant parties, the transmitter and the receiver, with provable security.

It relies on quantum physics principles and involves encoding information in quantum states, or qubits, as opposed to classical communication's use of bits. Usually, photons are used for these quantum states. Quantum key distribution exploits certain properties of these quantum states to ensure its security.

The security of this method comes from the well-known fact that the measurement of the quantum state of an unknown quantum system modifies the system itself. In other words, a spy eavesdropping on the quantum communication channel cannot get information on the qubit sequence exchanged between the transmitter and the receiver without introducing errors in the said sequence. Channels are to be understood in a generic sense: i.e. a physical medium which can transmit a modulation of some physical property. This modulation can be used to transmit data. A channel can be quantum, in the case of a modulation of a quantum property, or classical (modulation of a classical property).

As QKD does not prevent interception, but reveals it after it happened, it should not be used to transmit valuable information. It is instead used to send a sequence of random bits and verify whether the said sequence has been intercepted or not. If the sequence is secure, it can be used as an encryption key for use with a symmetric cryptography primitive. If it is insecure, the transmitter and the receiver should start again.

Once a secure encryption key has been exchanged, it can be used to secure transmission of useful payload by performing some kind of symmetric encryption.

One of the main benefits of QKD is that eavesdropping attempts can be detected. Any eavesdropping attempt has an impact on system behavior and more precisely on QBER (Quantum Bit Error Rate) and detection rate measurement. Both of these quantities can be measured by the transmitter and receiver.

Specific QKD systems are described in U.S. Pat. No. 5,307,410 to Bennett (which patent is incorporated herein by reference), and in the article by C. H. Bennett entitled "Quantum Cryptography Using Any Two Non-Orthogonal States", Phys. Rev. Lett. 68, 3121 (1992). A survey of the bases and methods as well as the historical development of quantum cryptography is contained in the articles by N. Gisin, G. Ribordy, W. Tittel and H. Zbinden, "Quantum Cryptography", Reviews of Modern Physics. 74, 145 (2002).

In a practical QKD application, the manufacturer of the transmitter QKD A and receiver QKD B defines a maximum quantum channel loss budget that is compatible with the said equipment. This value will define in which use cases the QKD transmitter and receiver can be used.

When deploying QKD, one typically has to reuse pre-installed optical fibers, which were in most cases laid in order to set up classical communication channels. Unfortunately, classical communication equipment is much more resistant to channel loss than QKD equipment. This implies that cases where the channel loss is compatible with classical communication, but exceeds the maximum quantum channel loss budget making QKD not applicable are frequent.

SUMMARY OF THE INVENTION

The invention provides a solution enabling to fine-tune and adapt quantum channel loss values depending on quantum channel segment characteristics.

It is inter alia an object of the present invention to allow a user to be able to define a quantum channel loss that includes the already known characteristics of quantum channel segments.

It is proposed to split the quantum channel in segments, each segment with its characteristics corresponding to a loss budget defined by the implemented devices and distance between segment starting and end point defined by the geometry of the installation.

This solution is valuable for QKD systems operation over long distance and including several optical systems such as multiplexers or optical switches. Advantageously disclosed solution provides QKD systems with higher key rate. This is not directly possible using QKD in its traditional implementation, as only one quantum channel loss value may be integrated in QKD systems by the user. The key benefit of the disclosed invention is to enable QKD to be deployed over quantum channel with losses exceeding the loss budget of traditional QKD implementations. In another element, the invention optimizes the key exchange rate achieved using QKD over a quantum channel with given losses.

Losses values are integrated through a user interface at emitter QKD A and receiver QKD B. Introducing these loss values enable to adapt optimal mean number of photons (µ) of coherent states emitted by QKD A at port A as a function of the loss values and detection probability at QKD B receiver.

An apparatus for enhancing secret key rate exchange over quantum channel in QKD systems comprises an emitter system with a quantum emitter and a receiver system with a quantum receiver. Emitter system and the receiver system are connected by a quantum channel and a service communication channel. User interfaces within the emitter and the receiver systems allow to define a first quantum channel loss budget based on the distance to be covered between the quantum emitter and the quantum receiver and the infrastructure properties of the quantum channel as well as a second quantum channel loss budget, wherein the second quantum channel loss budget is associated to the loss within the realm of the emitter system. The emitter system is adapted to define the optimal mean number of photons of coherent states to be emitted based on the first and the second quantum channel loss budgets.

The receiver system comprises another user interface being adapted to define a third quantum channel loss budget being associated to the loss within the realm of the receiver system wherein the receiver system is adapted to calculate the expected detection probability based on the first quantum channel loss budget, on the third quantum channel loss budget as well as based on the optimal mean number of photons of coherent states emitted.

An adapted QKD emitter comprises the quantum emitter and an associated processing unit, wherein the processing unit provides the output point of the service channel and the quantum emitter provides the output point of the quantum channel.

An optical element as e.g. a switch or beam splitter is positioned between said quantum emitter and said output point of the quantum channel inside the realm of the secure emitter zone.

A further optical element as e.g. a switch or beam splitter is positioned in the service channel, wherein the optical elements comprise a predetermined number of N outputs as N service channels as well as N quantum channels, wherein the plurality of N channel pairs are connected with N receiver systems.

Each of said N service channels and quantum channels pairs are combined into N transmission lines.

An adapted QKD receiver comprises the quantum receiver and an associated processing unit, wherein the processing unit provides the input point of the service channel and the quantum receiver provides the input point of the quantum channel.

An optical element is positioned between said quantum receiver and said input point of the quantum channel inside the realm of the secure receiver zone.

A QKD emitter or adapted QKD emitter is connected with an optical component, wherein a QKD receiver or adapted QKD receiver is connected with a further optical component, wherein the optical component and the further optical component are connected by a transmission line, incorporating the service channel and the quantum channel.

An emitter system according the invention comprises features as mentioned above and is adapted for a use within an apparatus according to the invention. A receiver system comprises features as mentioned above and is adapted for use within an apparatus according to the invention.

A method for enhancing secret key rate exchange over quantum channel in QKD systems, comprises: setting a predetermined loss value for the emitter system, setting a predetermined loss value for any one receiver system, determining the highest loss value for the involved receiver systems if there is more than one receiver system involved, setting a predetermined loss value for the transmission system, computing the optimal mean number of photons of coherent states to be emitted by the emitter system based on the first and the second quantum channel loss budgets, computing the expected detection probabilities at the involved receiver system, and running a key exchange between said emitter system and the involved receiver system.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
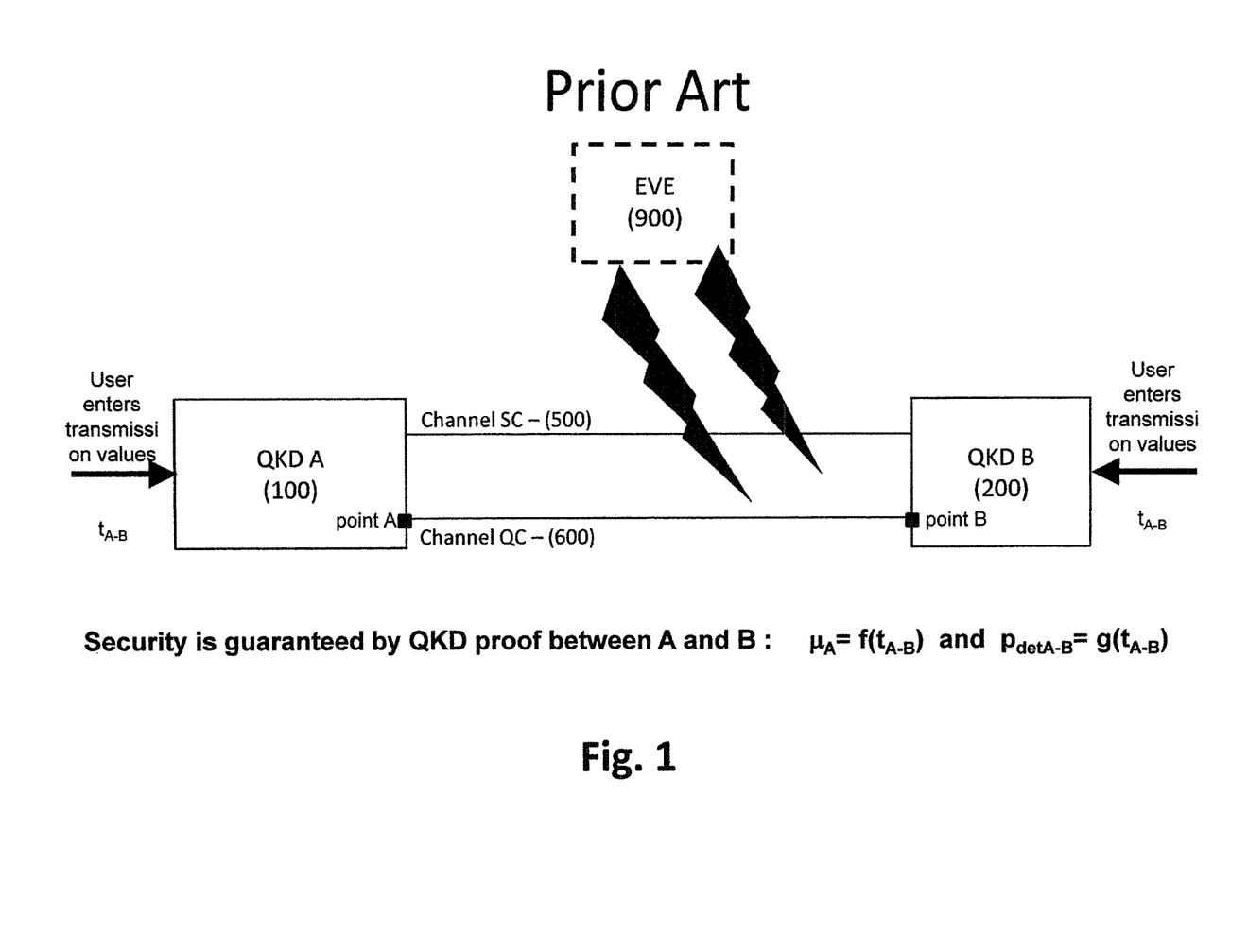
FIG. 1 shows a schematic diagram of a prior art communication system with QKD systems.

FIG. 1 is a schematic diagram of a prior art communication system with QKD systems based on those disclosed in U.S. Pat. No. 5,307,410 to Bennett and U.S. Pat. No. 5,953,421 to Townsend, which patents are incorporated herein by reference.

QKD is known as one of the quantum-safe techniques enabling eavesdropper detection on telecom fiber network. A typical deployment is illustrated in FIG. 1 and involves a pair of QKD devices 100 and 200 connected by two channels 500 and 600. The channel 500 is a classical channel and the channel 600 is a quantum one.

More precisely, in this implementation, quantum keys are distributed between emitter 100, called QKD A and receiver 200, called QKD B, through quantum channel 600. Usually, it is considered that QKD A 100 and QKD B 200 collaborate to secure quantum channel (QC) 600 between QKD A output port, called point A, and QKD B input port, called point B. Moreover, QKD A 100 and QKD B 200 are connected through a service channel (SC) 500 used for synchronization and classical communications enabling QKD A 100 and QKD B 200 to collaborate in order to generate a shared secret key. A simple implementation is to use a dedicated optical fiber for each channel but other possibilities exist based for example on multiplexing. On QC 600 information is carried by qubits. Although original proposals called for the use of single photons, most practical implementations of QKD rely on weak coherent pulses instead.

In this standard implementation, the QKD security proof for coherent optical pulses requires that the so-called optimal mean number of photons ($\mu$) of coherent states emitted by QKD A at point A is a function of the loss value between Point A and Point B. In such a case Point A, may be considered as a communication port interface at QKD A output and Point B a communication port interface at QKD B input. Moreover, detection probability ($p_{det}$) measured by QKD B is a function of $\mu$; the loss value between point A and point B, and the total efficiency of QKD B. Therefore usually QKD system allows its user to set one loss value defined as the loss value between point A and point B (note that the loss value is uniquely related to a corresponding value called the transmission using the following relationship: transmission=1−loss. In this disclosure, we will sometimes use the loss $L_{A-B}$ between points A and B and the transmission $t_{A-B}$). With this unique loss value, the QKD system is able to properly set µ and check $p_{det}$. Furthermore, the QKD system allows to enter several other parameter values like the initial secret key (used for the authentication of the first key generation round) or parameters related to service channel 500 for emitter 100 QKD A and receiver 200 QKD B communications.

Note that in order to compute the maximum information that an eavesdropper might have on the exchanged qubit sequence, the QKD system needs to measure the QBER of this qubit exchange in adding of knowing the transmission of the quantum channel (600)

From a threat model perspective, this traditional modeling of a QKD implementation assumes that the malevolent adversary Eve 900 can access the qubits exchanged between QKD A and QKD B at any points between Point A and Point B.

The required separation of the quantum signal transmitted through QC 600 from data signal transmitted though SC 500 may be provided through: (1) use of two separate fibers, one for each channel or (2) multiplexing of the channels in a single fiber.

The most widespread technique related to (2) is Wavelength Division Multiplexing (WDM). In this case a wavelength window is dedicated to the quantum signal and a separate wavelength window to the data signal. WDM enables signals of multiple wavelengths to be concurrently transmitted over a given optical medium. Several implementation alternatives have been disclosed where quantum channel is isolated by means of wavelength-sensitive passive optical components such as WDM couplers and filters in Townsend, P. D., "Quantum cryptography on optical fiber networks", SPIE Conference on Photonic Quantum Computing II, SPIE vol. 3385, (Orlando, Fla.). (April 1998), 12 pgs. and Townsend, P. D., "Simultaneous quantum cryptographic key distribution and conventional data transmission over installed fibre using wavelength-division multiplexing", Electronics Letters, 33(3), (1997), 2 pgs. Although they are less common, other kinds of multiplexing such as different polarization-division or time-division can also be used.

One of the main challenges in quantum cryptography consists in increasing the maximum optical loss allowing the key exchange operation between a transmitter QKD A 100 and a receiver QKD B 200. A higher loss budget implies a larger physical separation between the transmitter and receiver and translates in turn into broader use-cases for QKD.

As in any cases of communications, the maximum channel loss over which a QKD system can successfully exchange a secure key is limited. The maximum channel loss depends on the physical characteristics of the QKD system considered, such as dark count probability of the single photon detectors or optical contrast of the system. For a given QKD system this maximum loss value is known as the loss budget of the system.

The loss resilience of QKD is weaker than that of classical communication because the signal-to-noise levels are very different between quantum and classical communications. Therefore, the integration of QKD in classical networks is difficult, as the loss budget of a QKD system will typically be lower than that of the classical communication system it is to be combined with. This will result in challenges with or even impossibility to use QKD in certain applications. The typical loss budget of a commercial QKD system is 12 dB to 18 dB.

It is important to understand that any component inserted between QKD A 100 and QKD B 200 for optical network purposes will add extra loss in QC 600, limiting the loss budget available for the remaining of the QC 600 or reducing the secret key generation rate. Therefore, QKD weak loss resilience leads to QKD implementations on very short distances when network topologies are complex.

This issue has been tackled by researchers and one solution has been provided in the literature which consists in exploiting ultra-low loss fibers as suggested by B. Korzh., C. C. W. Lim, R. Houlmann, N. Gisin, M. J. Li, D. Nolan, et al., Provably secure and practical quantum key distribution over 307 km of optical fibre, Nat. Photonics 9 (2015) 163-168. This solution enabled to demonstrate Quantum Key Distribution over 307 kms with a 51.9 dB loss ultra-loss optical fibre. In the same way H L Yin, T Y Chen, Z W Yu, H Liu, L X You, Y H Zhou, S J Chen, Y Mao, et al., Measurement-Device-Independent Quantum Key Distribution Over a 404 km Optical Fiber, Physical Review Letters 117 (19), 190501, have demonstrated MDI-QKD with decoy-state over 404 kms exploiting an ultralow-loss fiber. However, this solution has limited relevance, when the user of a QKD system has to rely on pre-installed optical fiber due to costs constraints.

In the case of WDM set-ups, this issue has been particularly raised by Eraerds et al., 2010 emphasizing that 'in the case of insufficient isolation, additional filters can further improve the isolation, however at the expense of additional insertion loss in the quantum channel. Therefore, extending QKD distance operation requires most of all the adaptation of network infrastructure as QKD is very sensitive to channel losses. Likewise adding any component in a QKD set-up between the Transmitter QKD A 100 and Receiver QKD B 200 reduce QKD performances. Usual components in this sense are optical components interfering with the fiber lines as e.g. beam splitters, multiplexer/demultiplexer devices or optical switches. Such elements are also referred in this specification as optical components OC150 and 250.

Figure 2:
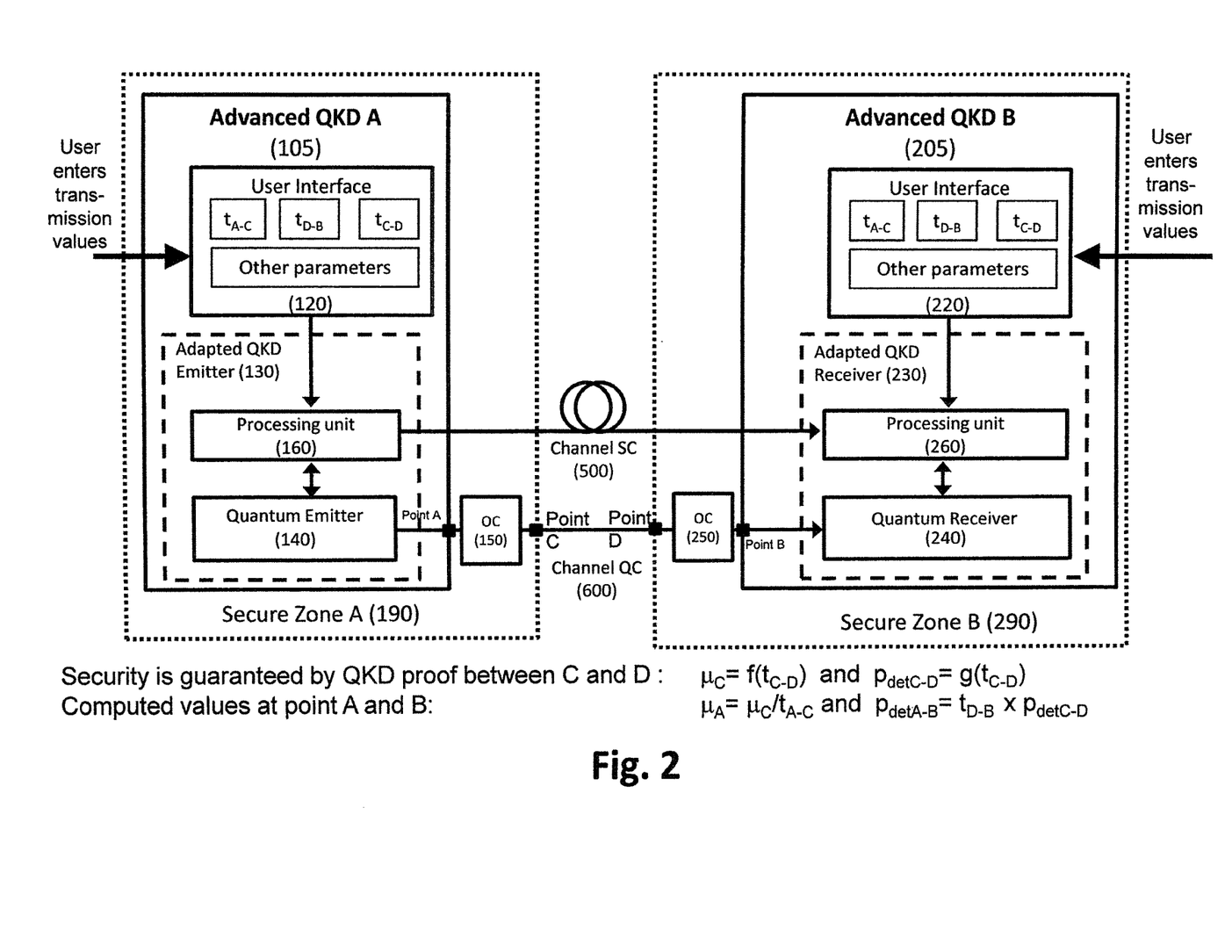
FIG. 2 shows a schematic diagram of an apparatus according to an embodiment of the invention.

FIG. 2 shows a schematic diagram of an apparatus according to an embodiment of the invention. Said apparatus comprises an Advanced QKD A transmitter 105 located in a secure zone A 190 and an Advanced QKD B receiver 205 located in a secure zone B 290. A secure zone is an area where QKD users may be confident about the inexistence of any eavesdropper. As an example a secure zone, one can think of a building with secured access requiring authentication where a QKD system is located. Transmitter secure zone 190 may include one or more optical components OC 150 characterized by their loss impact on QC 600 signal. Receiver secure zone 290 may as well include optical components OC250 characterized by their loss impact on QC 600 signal. As an example, OC 150 and 250 may consist of fiber, free space propagation, multiplexer/demultiplexer devices or optical switches. Advanced QKD A transmitter 105 and Advanced QKD B receiver 205 are exchanging quantum states through quantum channel QC 600 and classical communications through service channel 500. The main objective of this invention is to limit the section of QC 600 to secure with QKD to the section connecting secure zone 190 to secure zone 290. This section is considered as the insecure QC section. This section is delineated by point C on QKD A secure zone 190 and by point D on QKD B secure zone 290.

In summary, in FIG. 2, quantum channel QC 600 consists of three sections:
- Section A-C: from Advanced QKD A emitter 105 output port (called point A) to secure zone A 190 output port (called point C), characterized in that it is located in a secure zone and thus not accessible to any eavesdropper. Section A-C is characterized by an optical transmission $t_{A-C}$ taking into consideration that any optical component OC 150 may add some loss.
- Section C-D: from point C to secure zone B 290 input port (called point D), wherein Section C-D is characterized in that an eavesdropper may be able to have access to quantum channel QC 600 signal. Section C-D is characterized by a transmission $t_{C-D}$.
- Section D-B: from point D to QKD B receiver 200 input port (called point B), characterized in that it is located in a secure zone and thus not accessible to any eavesdropper. Section D-B is characterized by a transmission $t_{D-B}$ taking into consideration that any optical component OC 250 may add some loss.

Advanced QKD A transmitter 105 is composed of a user interface 120, a processing unit 160 and a quantum emitter 140. Thanks to the user interface 120, a user is able to introduce transmission and losses information related to the different sections A-C, C-D and D-B across which quantum states are exchanged.

Advanced QKD B receiver 205 is composed of a user interface 220, a processing unit 260 and a quantum receiver 240. Said quantum receiver 240 realizes the detection and determination of the probability $p_{det}$. Thanks to the transmission interface 220, a user is able to introduce transmission and losses related to the different zones across which quantum states are exchanged.

Processing unit 160 and 260 are connected thanks to SC 500 enabling Advanced QKD A and B synchronization and post-processing operations.

Knowing the transmission values of the three sections (A-C, C-D and D-B) entered by the user and having Quantum Emitter and Receiver devices able to compute properly the critical parameters of the quantum key exchange (i.e: are able to exchange secure keys between points A and B with a security level provided by QKD proofs between points C and D) through an adaptation of emitted mean number of photons ($\mu$) and expected receiver detection probability.

In practice, we can for example consider the case where $t_{A-C}=0.5$, $t_{C-D}=0.5$ and $t_{D-B}=0.5$. User enters those values into the advanced QKD systems (100 and 200) to define that he wants to have a secure key exchange on a section C-D with a transmission of 0.5, preceded by a section A-C with a transmission of 0.5 and followed by a section D-B with a transmission of 0.5. The three transmission values are sent to the Quantum Emitter and Receiver systems (140 and 240) through processing units (160, 260 respectively). Processing units 160 and 260 compute, as any other QKD systems based on weak coherent pulses, the optimum mean number of photon at point C ($\mu_C$) as a function of $t_{C-D}$ (e.g. $\mu_C=0.5$) and the expected probability of detection at point D ($p_{det\ C-D}$) as a function of $t_{C-D}$ ($p_{det\ C-D}=0.5*0.1=0.05$). Based on those values, the Quantum Emitter 140 and Quantum Receiver 240 are adapted to perform the QKD exchange with modified values that are the mean number of photon at point A ($\mu_A=p_C/t_{A-C}=0.5/0.5=1$) and the probability of detection at point B ($p_{det\ A-B}=t_{D-B}*p_{det\ C-D}=0.05*0.5=0.025$). Moreover, Processing units 160 and 260 compute the maximum information that an eavesdropper might have on the key exchange with the QBER and $t_{C-D}$.

Figure 3A:
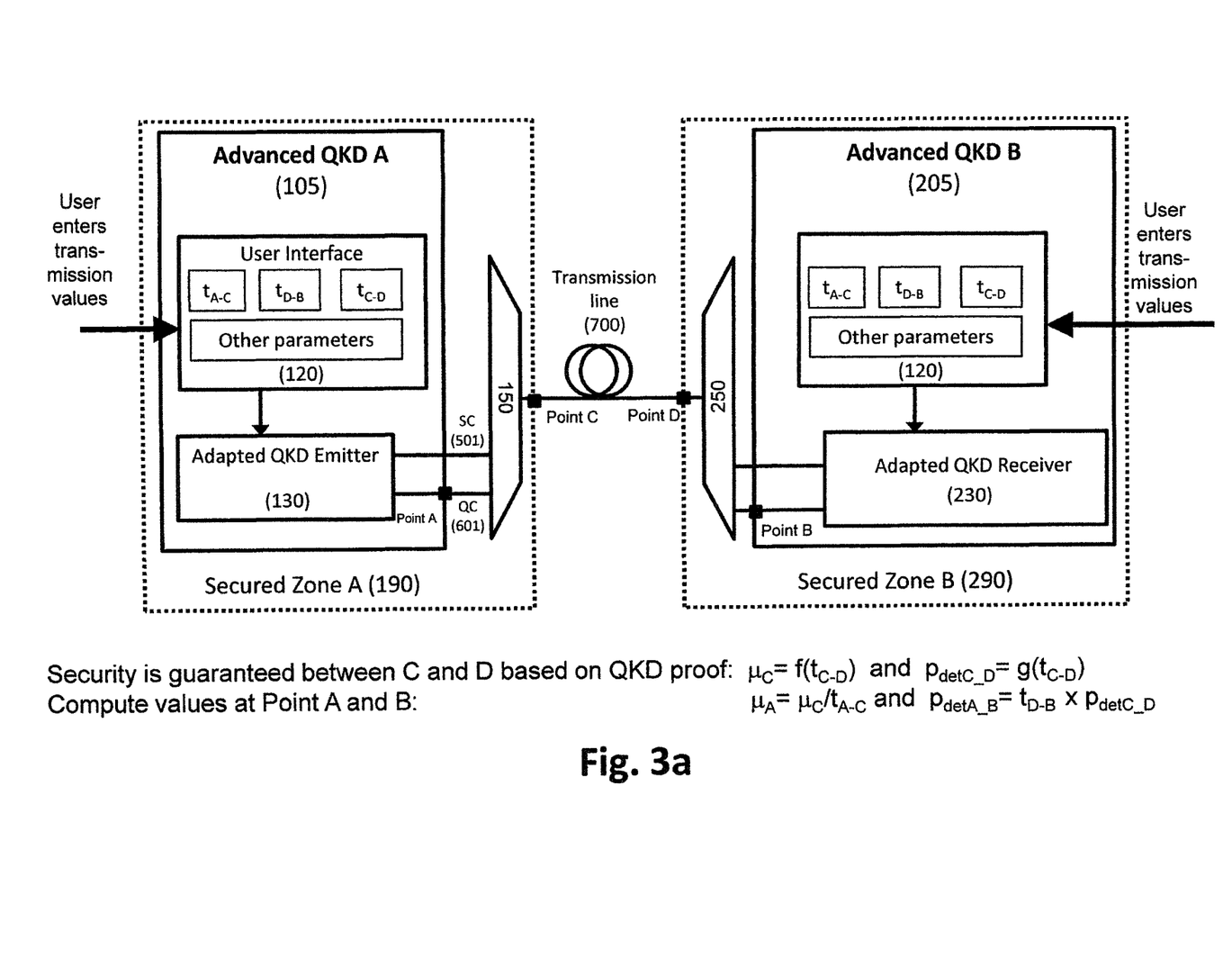
FIG. 3a shows a schematic diagram of an apparatus according to a further embodiment of the invention with a WDM implementation.
Figure 3B:
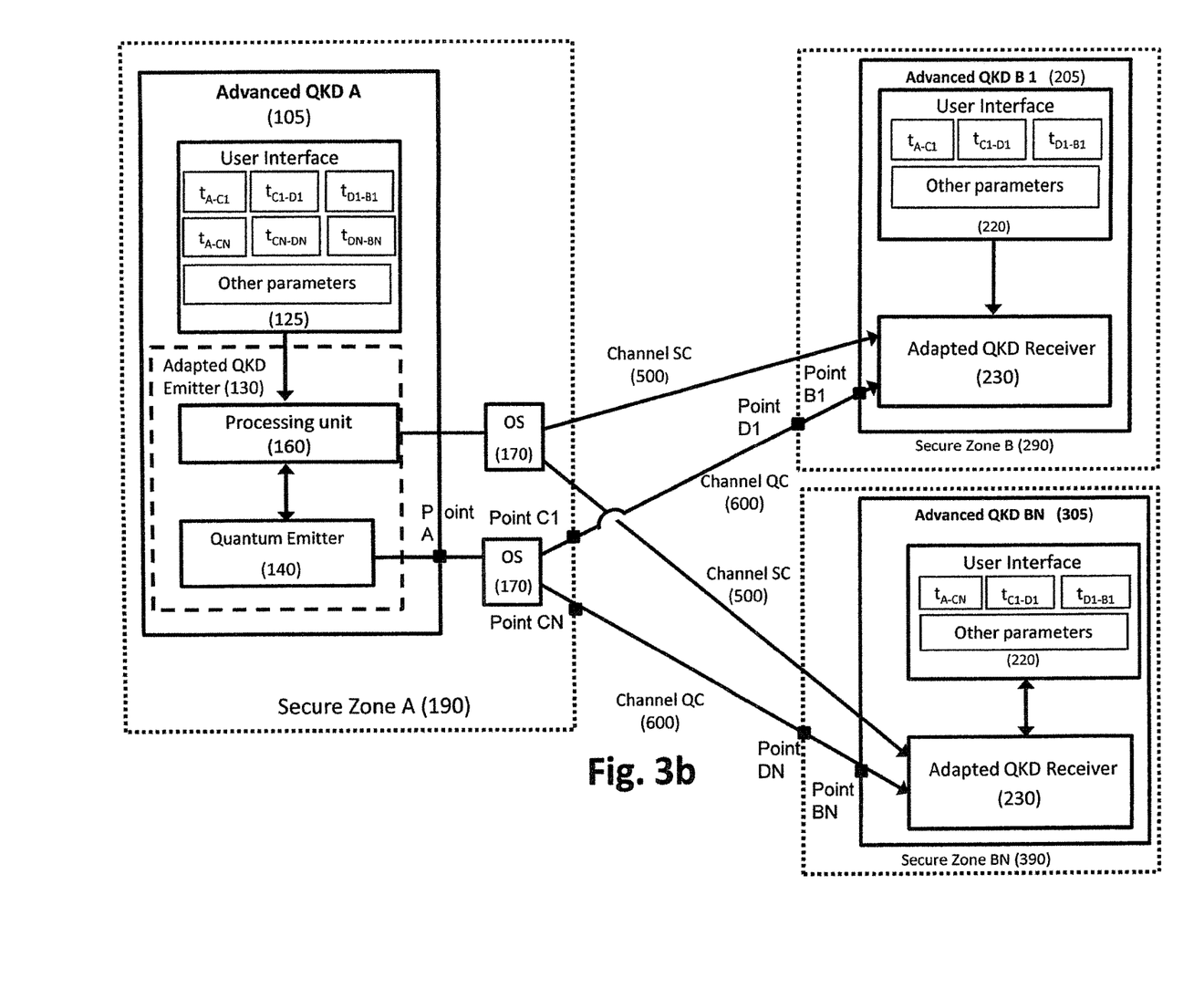
FIG. 3b shows a schematic diagram of an apparatus according to a further embodiment of the invention with a polygamous QKD implementation.

FIG. 3A and FIG. 3B show schematic diagrams of an apparatus according to further embodiments of the invention, applying to a WDM implementation (FIG. 3A) and to a polygamous QKD implementation (FIG. 3B), respectively. Polygamous QKD implementation refers to a set-up where one QKD Emitter A is connected to multiple QKD Receiver B1, . . . , BN. Identical or similar reference numerals are used in different drawings for identical or similar features.

FIG. 3a represents a specific apparatus according to a further embodiment of the invention based on a WDM infrastructure. In this second embodiment, quantum channel QC 601 is wavelength multiplexed with service channels 501. Typical wavelength multiplexer 150 and wavelength demultiplexer 250 have a significant amount of insertion loss. If the multiplexer 150 is located in the secure zone 190 hosting Advanced QKD A 105, one can consider that the output port of multiplexer 150 can be considered as point C or located between point A and point C. Similarly, if the wavelength demultiplexer 250 is located in the secure zone 290 hosting Advanced QKD B 205, one can consider this input port of this demultiplexer 250 as point D or that it is located between point D and point B. If these multiplexer 150 and/or demultiplexer 250 are located in the secure zones 190 and 290, respectively, their insertion loss values can be included within $t_{A-C}$ or $t_{D-B}$. This technique allows a higher mean number of photons to propagate in the channel section on the transmission line 700 where multiplexing occurs.

It is possible to replace adapted QKD emitter 130 of FIG. 3a by the adapted QKD emitter 130 of FIG. 2 having said associated processing unit 160 separated from the quantum emitter 140. The same is true for the adapted QKD receiver 230 of FIG. 3a, which can be replaced by the adapted QKD receiver 230 of FIG. 2 having said associated processing unit 260 separated from the quantum receiver 240.

As an example, typical QKD systems (such as the commercially available system CLAVIS[3] by ID Quantique SA, Carouge GE, Switzerland) accept a transmission loss up to 12 to 18 dB. This means that typical QKD systems may be integrated in network infrastructure with length up to sixty kilometers (60 km) to ninety kilometers (90 km) (0.2 dB/km×60 km=12 dB and 0.2 dB/km×90 km=18 dB). If an end-user is willing to integrate these QKD systems with WDM infrastructure, the end-user needs to take into consideration that multiplexer 150 will introduce 2 dB losses and demultiplexer will also introduce 2 dB loss. These losses impact significantly the distance over which QKD systems may operate as the maximal reachable distance may be in the range of forty kilometers (40 kms; 12 dB-2 dB 2 dB=8 dB; 8 dB/0.2 dB/km=40 km) rather than the initial sixty kilometers (60 kms). As a consequence, considering the multiplexers and demultiplexers part of the secure zones, along with the ability to introduce and adapt transmission values to this application scenario enables to limit the loss impact of optical systems such as multiplexers on QKD systems operation. This ability is given to end-users by:
(1) the user interface 120 that allows him to enter the transmission values of secure and insecure sections and
(2) the Quantum Emitter 140 and Receiver 240 that are able to guarantee key exchange with respect to QKD proofs within the insecure section through post-processing operations made by processing unit 160 and 260.

FIG. 3b represents a specific apparatus according to a further embodiment of the invention based on a multipoint QKD infrastructure with one transmitter 105 and multiple receivers 205, 305. This drawing can be related to two different embodiments depending on the kind of optical system OS 170 used, which can especially be a switch or a splitter.

In one specific embodiment (OS 170 being a switch), one QKD A transmitter 105 is connected to several QKD receivers (at least two QKD B1 205 and QKD BN 305). The emitter 105 consists of a QKD transmitter 130 as well as an optical switch OS 170 with 1 input and N outputs. N can be any natural number starting from 2, e.g. 4, 5, 10 or more. The user interface 215 allows defining the necessary number of transmission values. Optical system 170 can have the same or a different effect on signals distributed to every quantum channel 600 connecting with the different secure buildings I=1 to N, i.e. 290 to 390, respectively. Each output is connected to a receiver. The QKD transmitter is adjusted in such a way that the mean photon number per pulse is set to the appropriate level to maximize the secret key rate at the output of the optical switch and not as normally done at the output of the QKD transmitter.

This adjustment will be based on adapting attenuation of the optical channel between the optical switch and the targeted Advanced QKD receiver of the receivers 1 to N. Actually, Advanced QKD receivers B1 205 to BN 305 may be located at different distances from the emitter 105, thus requiring distinguished budget losses. "Most distant" in the present context has the meaning to have the highest loss, which is not necessarily the highest length depending on the possibly different loss per length unit. Usually in this type of embodiment an active switch is used in order to directly connect for a certain period of time Advanced QKD A Transmitter 105 with a specific Advanced QKD receiver that may be either Advanced QKD B1 205 or any one of Advanced QKD BI for I=2 to N, as Advanced QKD BN 305. Thanks to the use of an optical switch within the transmitter secure zone A 190, quantum states may be exchanged, without the need to use an active optical switch (which is an expensive component). Point C is replaced by different exit points CI=C1 to CN and Point D is replaced by entry points DI=D1 to DN for the different secure buildings 290 to 390.

Disclosed embodiment may be extended to an Advanced QKD A 105 transmitter including an optical switch with one input and N outputs. Each output is connected to a receiver. The Advanced QKD A 105 transmitter is adjusted in such a way that the mean photon number per pulse is equal set to the appropriate level to maximize the secret key rate at the output of the optical switch. Adjustment is based on the attenuation of the optical channel between optical splitter and most distant QKD receiver QKD BN.

In another specific embodiment (OS 170 being a splitter), as an example, typical QKD systems (such as the commercially available system CLAVIS³ by ID Quantique SA, Carouge GE, Switzerland) accept a transmission loss up to 12 to 18 dB. This means that typical QKD systems may be integrated in network infrastructure with length up to sixty kilometers (60 kms) to ninety kilometers (90 km). If an end-user wishes to integrate these QKD systems with an optical splitter OS 170 with 1 to 32 output ports (which means $2^5$ outputs), end-user needs to take into consideration that optical splitter 170 will introduce 5×3 dB losses, which means that an overall loss budget of 15 dB needs to be considered. These losses impact significantly the distance over which QKD systems may operate, possibly even making QKD impossible. In such a case, the Advanced QKD A 105 transmitter is adjusted in such a way that the mean photon number per pulse is set to the appropriate level to maximize the secret key rate at the output of the optical splitter in order to enable key exchange with the most distant Advanced QKD BN 305. Having this adaptation done enables key exchange between Advanced QKD A 105 transmitter and Advanced QKD B1 205 to BN 305 receivers.

As a consequence, having the capacity to introduce and adapt transmission values enable to limit the loss impact of optical systems such as multiplexers on QKD systems operation.

With this configuration, the invention enables to maximize the secret key rate between the emitter and the most distant QKD receiver as the signal attenuation caused by the optical splitter is not considered as being part of the quantum channel. This allows extending the range of the system.

Figure 4:
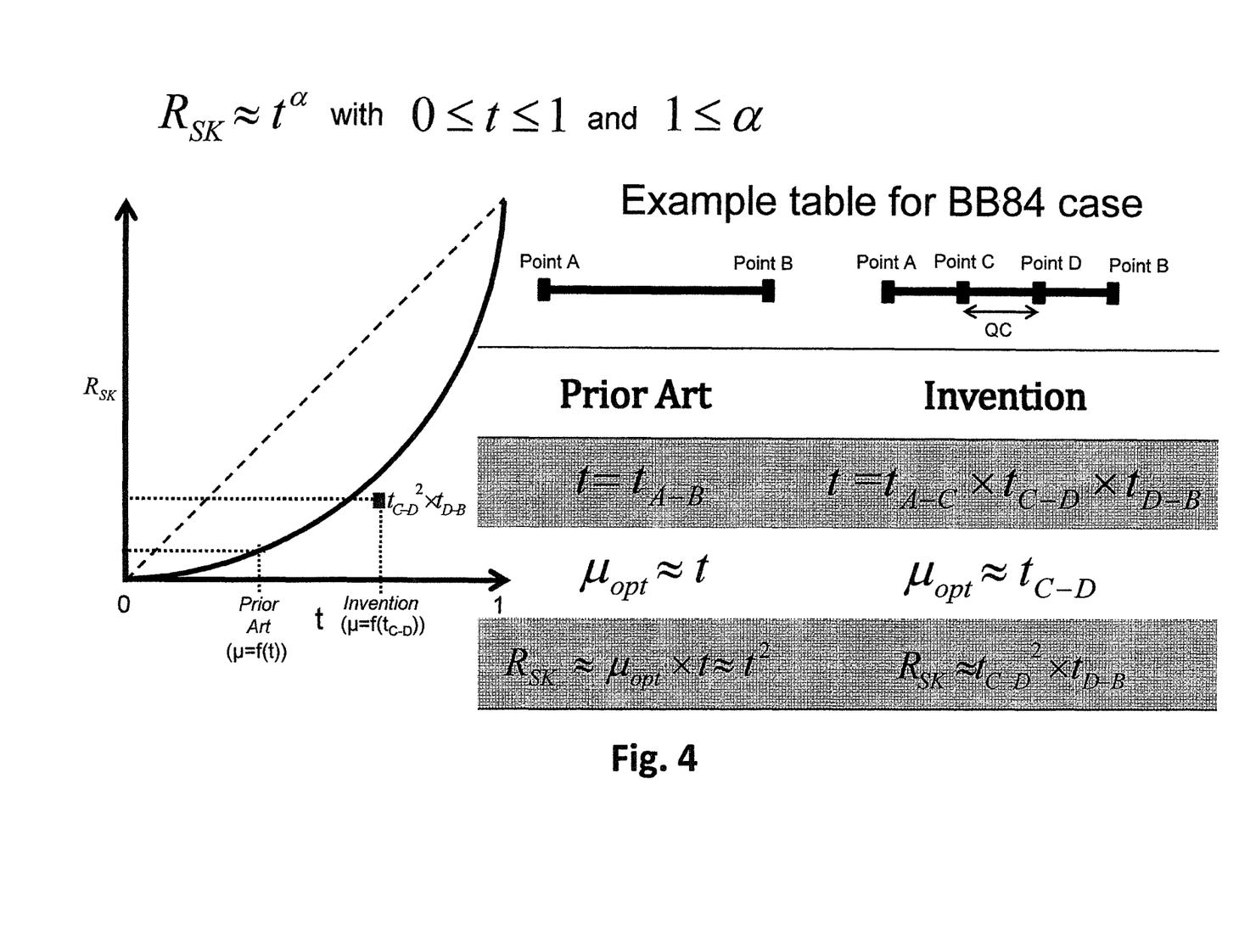
FIG. 4 shows a schematic diagram representing a behaviour model associated to an embodiment of the invention apparatus.

FIG. 4 represents a behavior model associated to an apparatus according to one of the embodiments of the invention.

In this context FIG. 4 shows a behavior model, wherein for QKD operation, the secret key rate is expressed as a function: $R_{SK} \approx t^\alpha$ with $0 \leq t \leq 1$ and $0 \leq \alpha \leq 1$.

$\alpha$ is a parameter that depends on the QKD protocol that is running in the QKD system. For example, in the case of the standard BB84 protocol implemented with coherent states $\alpha \sim 2$. As shown in the explanation table, this is due to the fact that the optimal mean number of photons is approximately equal to the transmission value of QC 600 ($t$).

According to the method presented here, the transmission value of QC 600 ($t$) is split into three terms: $t_{A-C}$, $t_{C-D}$ and $t_{D-B}$. The transmission value of QC 600 is the product of those three terms. One aim of the present invention is to guarantee the security of the qubit exchange in the insecure zone (i.e. between ports C and D) only. So, the mean number of photons at port C is about $t_{C-D}$, which is higher than t. The expected secret key rate in this case will about $t_{C-D}^2 \times t_{D-B}$. As can be seen on the graph in FIG. 4, this value is higher than the standard case that gives $t_2$, but it is smaller than the case where ports A and C are the same and ports D and B are the same. This graph shows that the present method might improve the performances of QKD quite strongly when it is based on coherent state implementation.

As an example, the invention behavior model may be illustrated by the table of FIG. 4 for the BB84 protocol based on weak optical pulses.

Having a decomposition of quantum channel 600 in three sections enables therefore to optimize the required optimal transmitter optical intensity as well as the obtained secret key rate. As a result it enables to obtain $R_{SK2} \gg R_{SK1}$.

Figure 5:
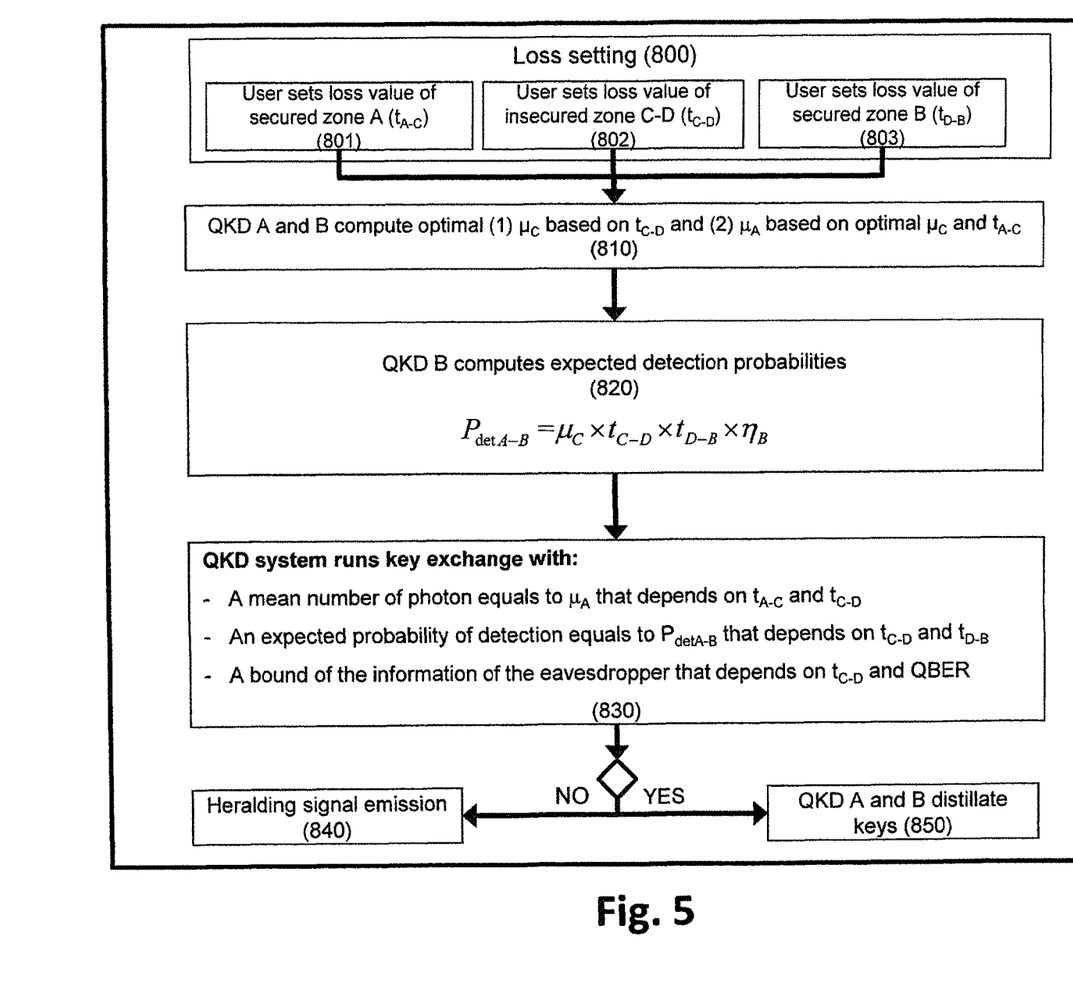
FIG. 5 shows a schematic diagram representing a method associated to the invention apparatus.

FIG. 5 represents a method according to an embodiment associated to the invention.

In a first step 800, losses are introduced in both advanced QKD systems (105 and 205). This step consists more precisely:

1—in sub-step 801, introducing the transmission value $t_{A-C}$ in the advanced QKD systems (105 and 205). Note that the transmission value can be introduced in one of the two systems and sent to the other one through the SC (500).

2—in sub-step 802, introducing the transmission value $T_{C-D}$ in the advanced QKD systems (105 and 205). Note that the transmission value can be introduced in one of the two systems and sent to the other one through the SC (500).

3—in sub-step 803, introducing the transmission value $T_{D-B}$ in the advanced QKD systems (105 and 205). Note that the transmission value can be introduced in one of the two systems and sent to the other one through the SC (500).

In a second step 810, advanced QKD A transmitter 105 and advanced QKD B receiver 205 compute:

(1) the optimal mean number of photons at point C ($\mu_C$) to guarantee the security of the key exchange between point C and point D.

(2) the mean number of photon at point A ($\mu_A$) to get a mean number of photon at point C equals to $\mu_C$ after the light propagation between points A and C ($\mu_A = \mu_C / \mu_{A-C}$).

In a third step 820, advanced QKD B receiver 200 computes expected probabilities of detection during the quantum state exchange. This computation is based on the following formula:

$$P_{detA-B} = \mu_C \times t_{C-D} \times t_{D-B} \times \eta_B$$

where $P_{detA-B}$ is the detection probability expected by the advanced QKD B receiver 205

$t_{C-D}$ is the quantum channel transmission between point C and point D $t_{D-B}$ is the quantum channel transmission between point D and point B.

$\eta_B$ is the internal efficiency of the advanced QKD B receiver 200.

In a last step 830, the advanced QKD systems (105 and 205) run as any QKD systems aiming at exchanging secret keys between point C and point D (i.e. the maximum information that an eavesdropper may have on the key is computed with $t_{C-D}$ and the QBER value), except that the mean number of photon at the output of the advanced QKD A emitter 105 equals the said computed $\mu_A$ and the expected probability of detection of the advanced QKD B receiver 205 equals the said computed $p_{detA-B}$. This calculation is also valid for QKD emitters 100 and QKD receivers 200 as shown in FIG. 2 and FIG. 3a, where one difference is the presence of separated processing units 160.

The invention claimed is:

1. An apparatus for enhancing a secret key rate exchange over a quantum channel in QKD systems which are based on weak coherent pulse, the apparatus comprising:
   an emitter system comprising a quantum emitter,
   at least one receiver system, each comprising a quantum receiver, and
   a user interface within the emitter system or within at least one of the receiver system(s),
   wherein the emitter system and the at least one receiver system are connected by the quantum channel and a service communication channel,
   wherein the user interface is adapted to define a first quantum channel loss budget based on a distance to be covered between the quantum emitter and one of the quantum receivers, and infrastructure properties of the quantum channel,
   wherein the user interface is adapted to define a second quantum channel loss budget, wherein the second quantum channel loss budget is associated with a loss within a realm of the emitter system, and
   wherein the emitter system or at least one receiver system is adapted to define a optimal mean number of photons of coherent states to be emitted based on the first and second quantum channel loss budgets.

2. The apparatus according to claim 1, wherein the receiver system comprises a further user interface being adapted to define a third quantum channel loss budget associated with a loss within a realm of the receiver system, and wherein the receiver system is adapted to calculate an expected detection probability based on the first quantum channel loss budget, on the third quantum channel loss budget, as well as based on the optimal mean number of photons of coherent states to be emitted.

3. The apparatus according to claim 1, wherein an adapted QKD emitter comprises the quantum emitter and an associated processing unit, and wherein the processing unit provides an output point of the service communication channel and the quantum emitter provides an output point of the quantum channel.

4. The apparatus according to claim 3, wherein a first optical element is positioned between said quantum emitter and said output point of the quantum channel inside a realm of a secure emitter zone.

5. The apparatus according to claim 4, wherein a second optical element is positioned in the service communication channel, wherein the first optical element and the second optical element comprise a predetermined number N of outputs as N service communication channels as well as N quantum channels, and wherein the plurality of N channel pairs are connected with N receiver systems.

6. The apparatus according to claim 5, wherein the second optical element is a splitter or a switch.

7. The apparatus according to claim 5, wherein each of the N service channel and quantum channel pairs are combined in N transmission lines.

8. The apparatus according to claim 1, wherein an adapted QKD receiver comprises the quantum receiver and an associated processing unit, and wherein the associated processing unit provides an input point of the service communication channel and the quantum receiver provides an input point of the quantum channel.

9. The apparatus according to claim 8, wherein an optical element is positioned between said quantum receiver and said input point of the quantum channel inside a realm of a secure receiver zone.

10. The apparatus according to claim 1, wherein a QKD emitter or an adapted QKD emitter is connected with a first optical component, wherein a QKD receiver or an adapted QKD receiver is connected with a second optical component, and wherein the first optical component and the second optical component are connected by a transmission line, incorporating the service communication channel and the quantum channel.

11. A method for enhancing secret key rate exchange over quantum channel in a QKD system based on weak coherent pulses with an emitter system and a predetermined number of receiver systems each connected via a transmission system with the emitter system, the method comprising:
   setting a predetermined loss value for the emitter system,
   setting a predetermined loss value for every one of the number of receiver systems,
   determining a highest loss value for said number of receiver systems if there is more than one receiver system involved,
   setting a predetermined loss value for the transmission system,
   defining a first quantum channel loss budget based on the distance to be covered between the quantum emitter and one of the quantum receivers and the infrastructure properties of the quantum channel,
   defining a second quantum channel loss budget, wherein the second quantum channel loss budget is associated to the loss within the realm of the emitter system,
   computing an optimal mean number of photons of coherent states to be emitted by the emitter system based on first and second quantum channel loss budgets,
   computing expected detection probabilities at the involved receiver system, and
   running a key exchange between said emitter system and the involved receiver system.

* * * * *